(12) United States Patent
Pulkka et al.

(10) Patent No.: US 7,710,873 B2
(45) Date of Patent: May 4, 2010

(54) INTERACTION IN A COMMUNICATION SYSTEM

(76) Inventors: Pekka Pulkka, Karinkannantie 15 C 2, FIN-80900 Oulu (FI); Marita Pistemaa, Kuovitie 5 C 16, FIN-90540 Oulu (FI); Tommi Koistinen, Kyyhkysmäki 22 B 19, FIN-02600 Espoo (FI)

( * ) Notice: Subject to any disclaimer, the term of this patent is extended or adjusted under 35 U.S.C. 154(b) by 1695 days.

(21) Appl. No.: 10/332,062

(22) PCT Filed: May 28, 2001

(86) PCT No.: PCT/EP01/06091
§ 371 (c)(1),
(2), (4) Date: May 8, 2003

(87) PCT Pub. No.: WO02/03624

PCT Pub. Date: Jan. 10, 2002

(65) Prior Publication Data
US 2003/0169751 A1    Sep. 11, 2003

(30) Foreign Application Priority Data
Jul. 3, 2000    (GB)    ................................ 0016351.9

(51) Int. Cl.
*H04L 1/00* (2006.01)
(52) U.S. Cl. .................. 370/235; 370/252; 370/389; 370/401
(58) Field of Classification Search .......... 370/252, 370/332, 352–356, 389, 395.4, 395.43, 253, 370/401, 468, 395.21, 395.42; 379/386; 709/238, 240
See application file for complete search history.

(56) References Cited

U.S. PATENT DOCUMENTS

| | | | | |
|---|---|---|---|---|
| 5,870,549 A * | 2/1999 | Bobo, II | ...................... | 709/206 |
| 6,023,456 A | 2/2000 | Chapman et al. | | |
| 6,038,230 A * | 3/2000 | Ofek | .......................... | 370/389 |
| 6,173,054 B1 * | 1/2001 | Beyda et al. | ................. | 379/386 |
| 6,603,760 B1 * | 8/2003 | Smyk | ........................ | 370/352 |
| 6,765,903 B1 * | 7/2004 | Allen et al. | .................. | 370/356 |
| 6,765,909 B1 * | 7/2004 | Sen et al. | .................... | 370/392 |
| 6,765,931 B1 * | 7/2004 | Rabenko et al. | ............. | 370/493 |
| 6,775,269 B1 * | 8/2004 | Kaczmarczyk et al. | ...... | 370/352 |
| 6,885,658 B1 * | 4/2005 | Ress et al. | ................... | 370/352 |
| 6,937,566 B1 * | 8/2005 | Forslow | ..................... | 370/231 |
| 7,068,644 B1 * | 6/2006 | McConnell et al. | ......... | 370/352 |
| 2006/0274769 A1 * | 12/2006 | Gardner et al. | .............. | 370/401 |

* cited by examiner

*Primary Examiner*—Ricky Ngo
*Assistant Examiner*—Pao Sinkantarakorn

(57) ABSTRACT

The present invention relates to a gateway between two networks of a communication system. A plurality of communication service classes is available for the communication between the networks. In the method a call is routed from a network to another network via the gateway. The type of the call is defined. A gateway controller also determines the communication service class that is to be used for the call. The gateway controller communicates information that associates with the determined service class to the gateway. The communication is based on a communication protocol message that has been adapted to transport the information between the gateway controller and the gateway. The call is then processed based on the information.

35 Claims, 6 Drawing Sheets

INTERACTION IN A COMMUNICATION SYSTEM

FIELD OF THE INVENTION

The present invention relates to interaction between networks in a communication system, and in particular, but not exclusively, to a gateway between different communication networks.

BACKGROUND OF THE INVENTION

Communication systems are known by a skilled person. A communication system may provide the user, or more precisely, user equipment or terminal, with connection-oriented communication services and/or connectionless communication services. An example of the first type is a circuit switched connection where a circuit is set-up with call set-up and admission control. This type of arrangement is used e.g. in public switched telephone networks (PSTN). An example of the connectionless communication services is a so called packet switched service. Packet switched communication is typically used in the Internet Protocol (IP) based networks. Both of the circuit switched and the packet switched services can be used for communicating packet data. Packet data services can be defined in general as services that are capable of transporting data units (data packets or similar data entities of fixed or variable length) between two signalling points, such as between two terminals or other nodes of the communication system.

In the connectionless services no circuit is set up, but each data entity itself contains an address. Upon arrival of the data entity in a node the address thereof may be looked-up in a table in the node, and the data entity is transported in the next hop to an address that corresponds to that address entry in the table. Instead of hops, in the circuit switched connections the nodes typically maintain information of how to route/switch each packet belonging to that flow. The circuit switched networks often have fixed-length packets called cells whereas packet-switched networks carry data units of variable length (e.g., the IP). However, there are also data networks that carry variable length data units in a connection-oriented architecture, such as Multi Protocol Labeled Switched (MPLS) networks.

A network that is capable of transporting data units or corresponding data entities between two or more nodes is referred to in the following as a data network. The data network may be a communication network that is based on use of a fixed line or wireless communication media. The fixed communication line network may comprise e.g. a public switched telephone network (PSTN), an integrated digital services network (ISDN) or an asynchronous data subscriber line (ADSL) network. The wireless communication network may be based on an appropriate public land mobile network (PLMN) standard, such as a GSM (Global system for mobile communication), general packet radio service (GPRS), enhanced data rate for GSM evolution (EDGE) or a third generation (3G) communication system such as the universal mobile telecommunication system (UMTS) or e.g. to a satellite based wireless communication standard. The wireless connection may be provided only for a part of the connection between the two nodes, that is, the fixed line networks may also comprise wireless communication.

A media gateway is a node that may be used for transforming media (e.g. speech or other communication) between the SCN (switched circuit network) and data network (such as the Internet Protocol based network) sides of the connection. An ITU-T recommendation draft H.248 titled 'MEGACO' (Media Gateway Control) defines a gateway control protocol that may be used in communication between a media gateway controller (MGC) and a media gateway (MG) enabling the gateway controller to control the gateway. The gateway control protocol is adapted for use in generation, connection and removal of different kinds of termination features. These operation include e.g. connecting a IP/UDP/RTP (Internet Protocol/User Datagram Protocol/Real-Time Transport Protocol) port to a certain time slot. In addition, the MEGACO gateway protocol may be used for transmitting information regarding instances such as tones that have been detected on the line and so on or request to generate required tones. It should be appreciated that the referenced ITU-T recommendation does not necessarily constitute the state of the art.

A quality of service (QoS) function has also been proposed for the packet switched networks. In general, the quality of service refers to feature by means of which different connections are provided with different service levels (i.e. different service classes). The QoS class to be used for a connection may depend e.g. on the agreement (subscription) between the user and the service provider, call type (e.g. normal call/emergency call) and so on.

Quality of Service (QoS) provisioning may be implemented using a so called differentiated services ('DiffServ') architecture. The term 'DiffServ' refers to differentiated service architecture for internet protocol (IP) networks. For example, the 3GPP (third generation partnership project) standardisation body has selected the DiffServ framework as the quality of service model for the core IP network. The QoS provisioning is obtained by appropriate marking of data units to be communicated in the IP network.

An IETF document RFC 2475 defines more particularly an architecture for implementing a scalable service differentiation in the Internet. The proposed differentiated services architecture performs its functions on the network level. Differently marked packets will receive a different priority in queuing and/or scheduling of nodes (so-called Per-hop-behaviour). The marking may depend dynamically on a time-averaged estimate of the data flow. The differentiated services is based on marking of the IP data packets with required data class and traffic contract information. For this the IPv4 (Internet Protocol version 4) header field 'Type of Service' (ToS) has been renamed as 'DiffServ' field. This has been proposed since the ToS field has never been widely used, and thus it could be renamed with a minimal impact. The DiffServ field is adapted to define parameters such as the QoS class, traffic contract and acceptable limits for the delay and packet loss.

It is believed that voice traffic may eventually (e.g. in the 3GPP release 2000 and beyond) run directly from a radio access network controller (RNC) of a cellular telecommunication network to the IP network or to the PSTN network through a media gateway (MGW) therebetween. This may require that the MGW is enabled to map the PSTN traffic to the IP-side quality-of service (QoS) classes and vice versa.

The inventors have found that if the media gateway is not notified about the QoS class to be used for a connection, the media gateway may set (e.g. mark) all speech packets to be sent in one QoS class (based on the TOS info) or may not set the QoS parameter at all. The inventors have also found that it might be advantageous if it could be possible to separate different speech calls or other calls within a call type class from each other (e.g. an emergency call from a "normal" or other lower priority call) in other devices that are based on a data network protocol, such as the IP.

What is needed is a standardised way for the media gateway controller to inform the media gateway on a call by call basis which service class is to be used for the data entities for a call.

SUMMARY OF THE INVENTION

Embodiments of the present invention aim to address one or several of the above problems.

According to one aspect of the present invention, there is provided a method in a communication system, comprising: routing a call from a first network to a second network via a gateway; defining the type of the call; determining in a gateway controller function a communication service class that is to be used for the call; communicating to the gateway information that associates with the determined communication service class by means of a communication protocol message adapted to transport said information from the gateway controller to the gateway; and processing the call based on said information received at the gateway.

According to another aspect of the present invention there is provided a communication system, wherein a plurality of communication service classes may be used for calls in said system, comprising: a first network; a second network; a gateway between said networks; processor means for defining the type of a call routed through the gateway; a gateway controller for controlling the gateway, the gateway controller being adapted to determine the communication service class of the call; interface between the gateway controller and the gateway for communicating information that associates with the determined service class by means of a communication protocol message adapted for the transport of said information; and call processing means for processing the call in accordance with the information received at the gateway.

According to another aspect of the present invention there is provided a gateway arrangement for a communication system, comprising: a gateway function; a controller function for controlling the gateway function, the controller function being adapted to determine the communication service class of a call routed through the gateway function; processor means for defining the type of the call routed through the gateway function; interface between the controller and the gateway functions for communicating information that associates with the determined service class by means of a communication protocol message adapted for the transport of said information; and call processing means for processing the call in the gateway function in accordance with the information received at the gateway.

In more specific embodiments, the communication protocol message is based on a gateway control protocol. The protocol may be based on ITU-T recommendation No. H.248 extended to include an element that is capable of communicating said information. The service class information may be contained in a data element that is included in the protocol message. The protocol message may be adapted to transport information that associates with the type of service field of the call or with differentiated services codepoint or with multi-protocol label switched/asynchronous transfer mode parameter.

The type of the call may be defined based on information from a call type detection function provided in the gateway. The call type may also be defined based on information that associates with the call and that is available for the gateway controller.

The call may be classified by a classifier function of the gateway based on the class information received from the gateway controller function. The service differentiation may be based on mapping between multi-protocol label switched tunnels and asynchronous transfer mode channels. The gateway may assign data packets that associate with the call with a class identifier based on said information of the determined service class.

The embodiments of the invention may provide a possibility for classifying different calls into different priority or other classes between two networks.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
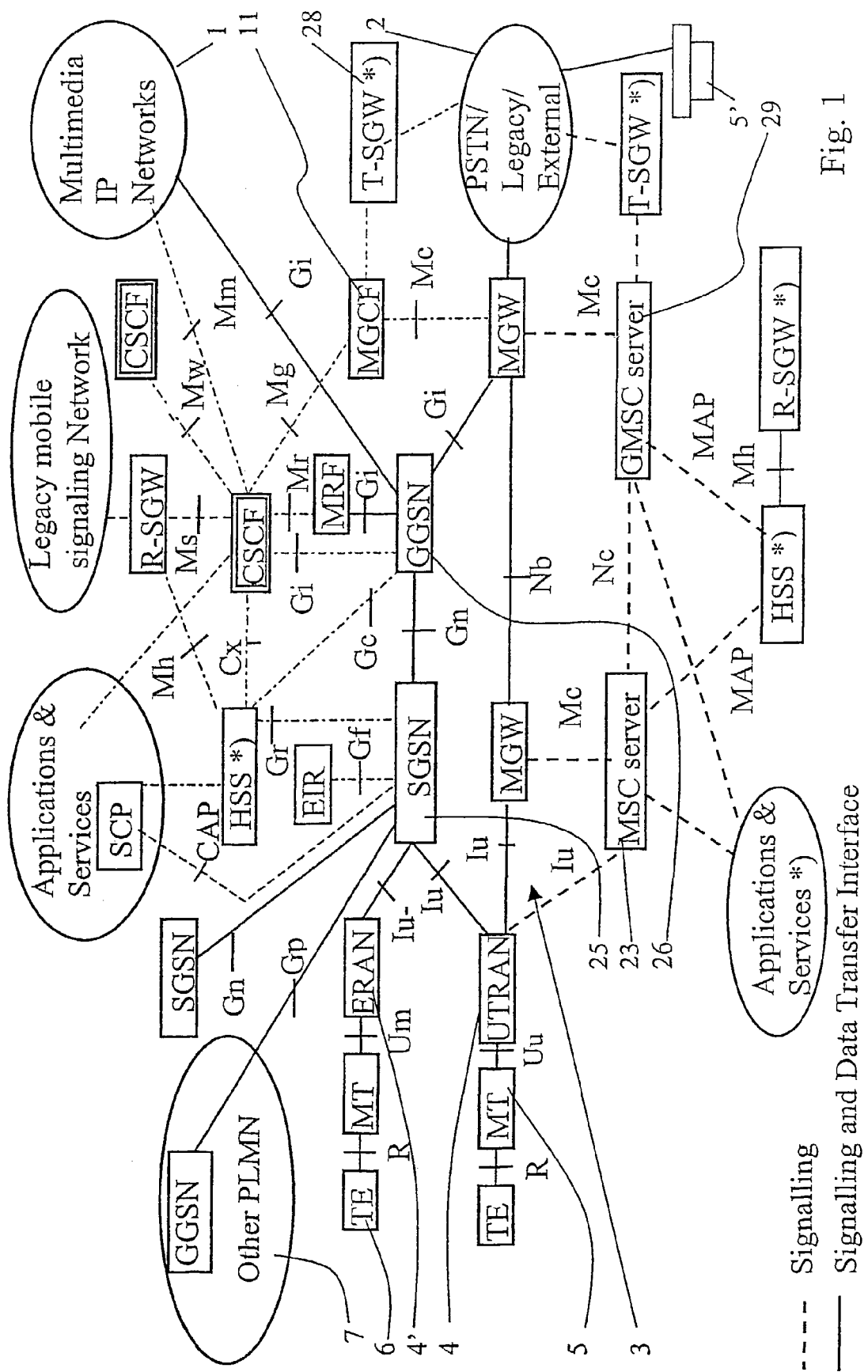
FIG. 1 shows a communication system architecture wherein embodiments of the present invention may be implemented.

Reference is first made to FIG. 1 which shows a communication system architecture wherein embodiments of the present invention may be implemented. It should be appreciated that the term 'call' used in this specification is intended to refer to all types of communication connections between two signalling points in the communication system.

More particularly, FIG. 1 presents a so called 3GPP "All-IP" reference architecture. Elements marked with a star (*) are duplicated in the FIG. 1 presentation in order to maintain the clarity of the network layout. These elements may, however, belong to a same logical element in a practical implementation of the architecture. A solid line indicates a signalling and data transfer interface between the various elements of FIG. 1, whereas a dashed line indicates a signalling interface. The first interface types are generally for user plane communication (i.e. for the actual data to be transported between the termination points) whereas the latter interface types are for call related signalling (such as for call set-up and so on).

FIG. 1 shows an Internet Protocol (IP) based data network 1 and other communication networks that may communicate with the data network 1. The other networks may interwork with the IP network via a media gateway (MGW) entity 10 and a signalling gateway entity 28. In general, the term gateway refers to a network element that enables interworking between two networks. A gateway is typically adapted to handle different signalling standards for the communication with different networks so that the elements of the different networks may "understand" each other. Although FIG. 1 shows two separate gateway elements for the signalling and for the user plane traffic, the signalling gateway may be integrated with the user plane gateway.

In FIG. 1 the other networks comprise a public switched telephone network (PSTN) 2, a third generation UMTS (universal mobile telecommunication service) public land mobile network (PLMN) 3 and another PLMN 7. The another PLMN may be, for example, another $3^{rd}$ generation network or a network based on the GSM (Global System for Mobile communications) standard or any other standard providing wireless services for mobile users. The PLMN system enable mobile stations 5 to communicate through base (transceiver) stations (not shown) of a radio access network. The mobile stations may be provided with a packet switched (PS) wireless connection and/or a circuit switched (CS) wireless connection with the base station, depending the standard of the PLMN system. The location of the mobile user equipment could be fixed (for example if it is providing radio communications for a fixed site) or the mobile terminal could be moveable (for example if it is a hand portable transceiver or "mobile phone"). The mobile station or similar user equipment may be provided with appropriate terminal equipment 6, such as with a data processing facility or a location measurement unit.

In addition to the radio access network, a PLMN typically comprises a core network (CN) part. Therefore the illustrated PLMN system 3 comprises a core network (CN) (e.g. a General Packet Radio Service GPRS core network), a UMTS terrestrial radio access network (UTRAN) 4, and an EDGE (enhanced data rate for GSM evolution) mobile data radio access network 4'. The core network (CN) of FIG. 1 includes both UMTS elements and GSM elements. The FIG. 1 core network is composed of a Mobile Services Switching Centre (MSC) 23, a Serving GPRS (General Packet Radio Service) Support Node (SGSN) 25 of the UMTS system, a Gateway GPRS Support Node (GGSN) 26, and a Gateway Mobile Services Switching Centre (GMSC) 29. As shown, the elements of the core network (CN) can be connected to a number of external networks. The external networks can be either circuit switched (CS) networks (e.g. the other public land mobile network PLMN 7, public circuit switched network PSTN 2, or integrated services digital network ISDN, not shown) or packet switched (PS) networks (e.g. the Internet protocol (IP) based data network 1).

It should be appreciated that the above described PLMN communication arrangement is only an example, and that other types of communication networks, including another data network or a network based on an appropriate satellite telecommunication standard, may also be arranged to communicate with data networks, such as the data network 1, via an appropriate media gateway.

Figure 6:
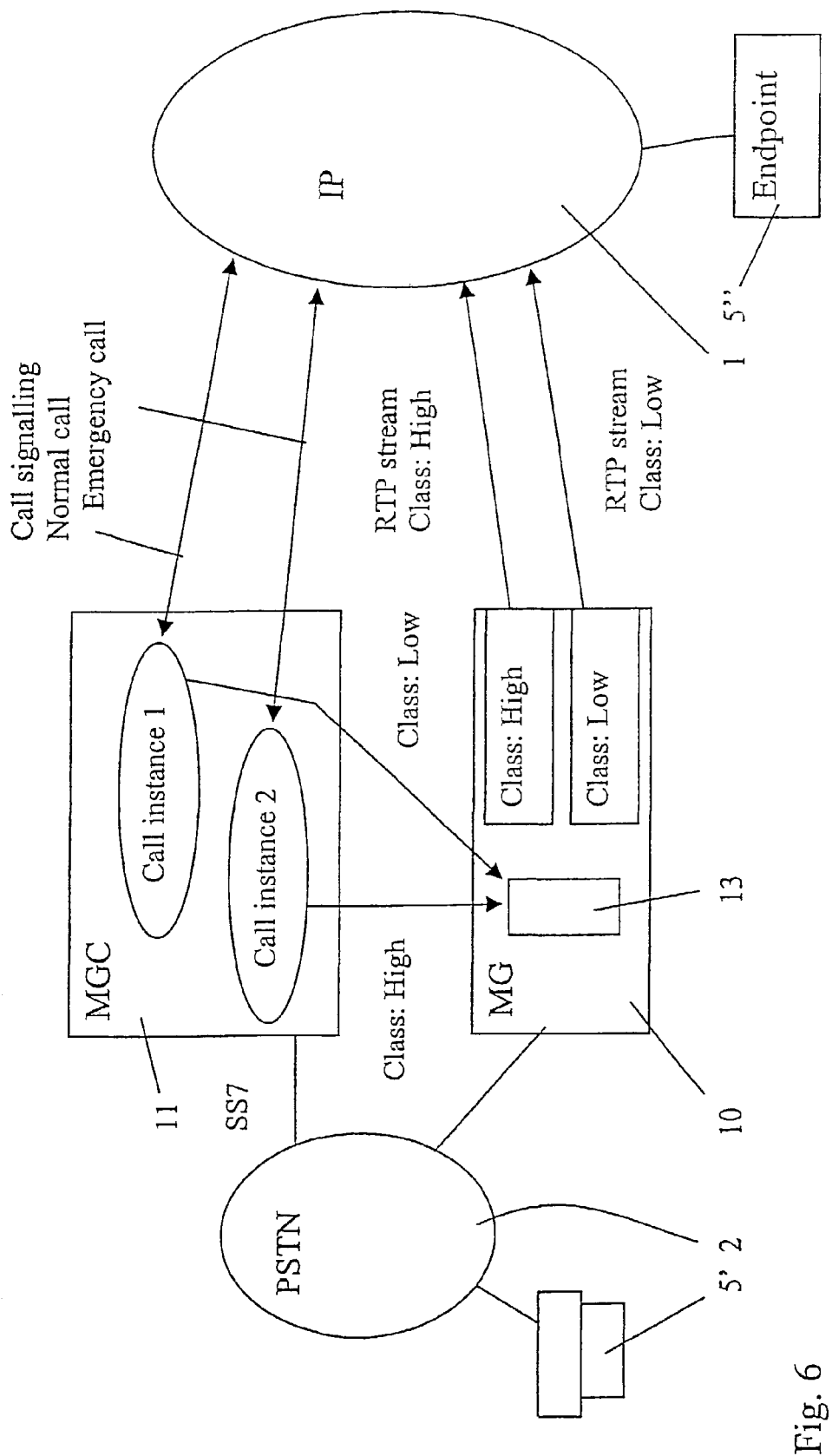
FIG. 6 illustrates an embodiment of the present invention.

FIG. 1 shows also a media gateway controller (MGC) element 11 that forms a logical entity of the system. The media gateway controller may contain information regarding the origin and destination of a call having an origination point in a network and termination point in another network (e.g. between terminals 5 and 5' in FIG. 1 or terminals 5' and 5" in FIG. 6). The gateway controller may also contain information regarding the type of the call or it may be enabled to obtain this information from an appropriate source. In the herein described embodiments the gateway controller 11 is adapted to make the decision regarding the QoS class that is to be used for a call via the gateway 10.

The gateway controller 11 is arranged to control the operation of the gateway 10 over a media controller (Mc) interface between the two elements. The communication standards typically define the media gateway (MG) and the media gateway controller (MGC) as logically separated entities. However, it should be appreciated that these logically separated functions may be located in a single node or network element. The communication over the Mc interface may be based on an appropriate control messaging protocol, such as the above referred H.248 protocol defined by ITU-T. It should be appreciated that the H.248 protocol does not necessarily form a state of the art for the embodiments of the present invention.

In accordance with an embodiment of the present invention, the proposed H.248 protocol is extended so that a protocol message between the controller 11 and the gateway 10 contains an element that is adapted to transport information that associates with the service classes that are available for calls between two networks via the media gateway 10. The control protocol may be extended, for example, such that it may communicate information associated with the 'Type of Service' (ToS) field, the DiffServ codepoint or the MPLS/ATM parameter for a call. This information is preferably transferred in an appropriate packet data format from the controller 11 to the gateway 10.

Figure 2:
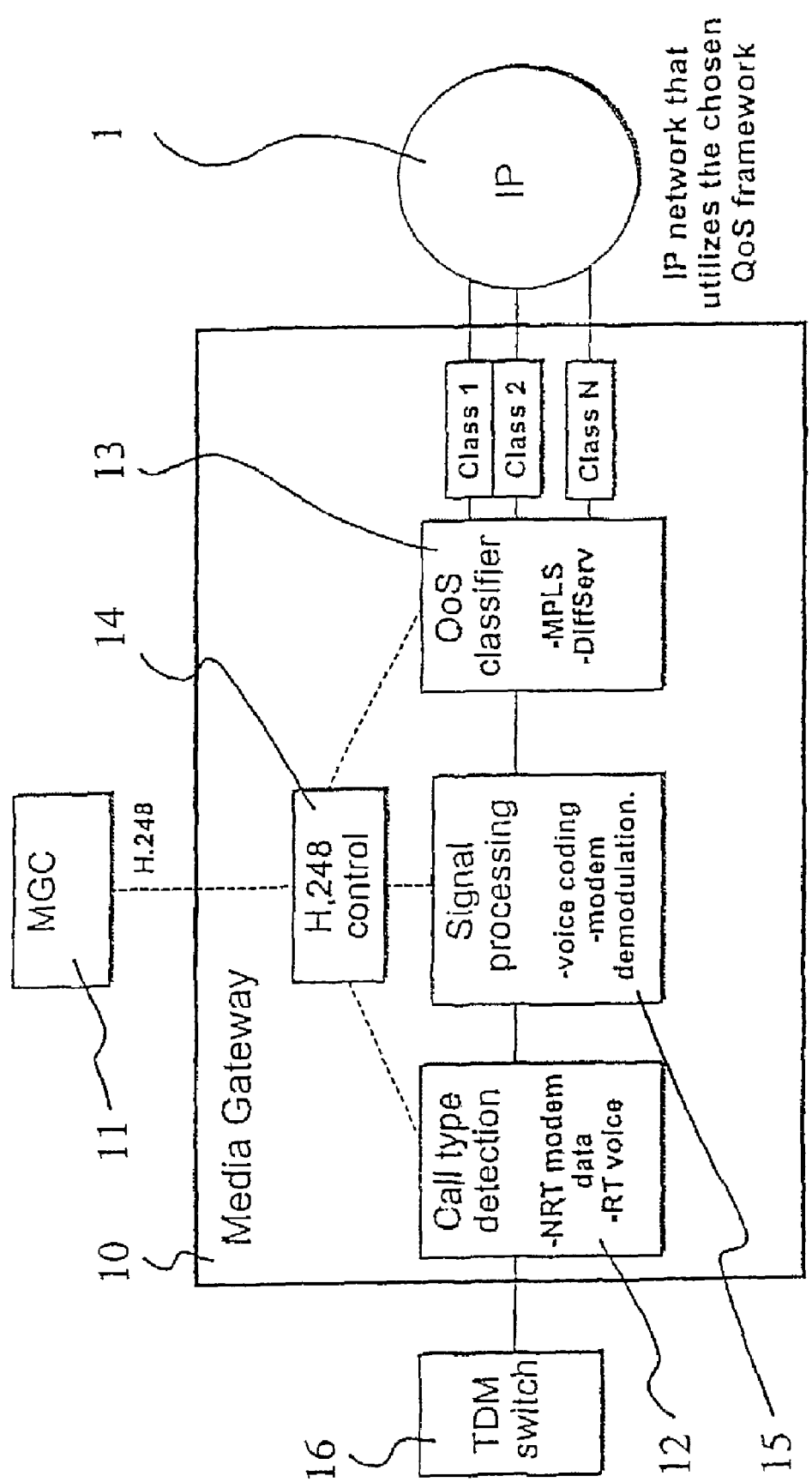
FIG. 2 shows a media gateway architecture in accordance with an embodiment of the present invention.
Figure 3:
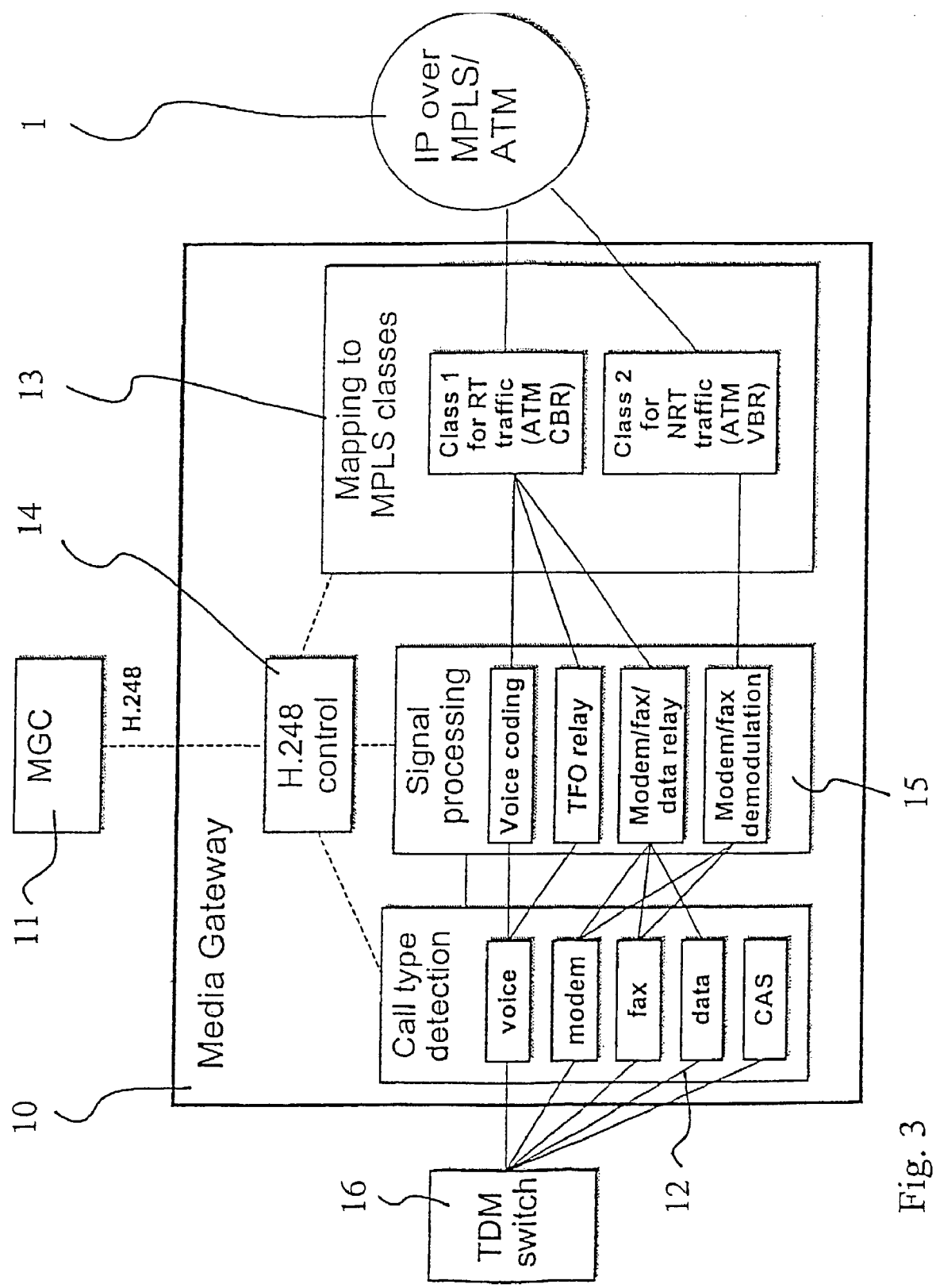
FIGS. 3 and 4 show two more specific embodiments of the present invention.
Figure 4:
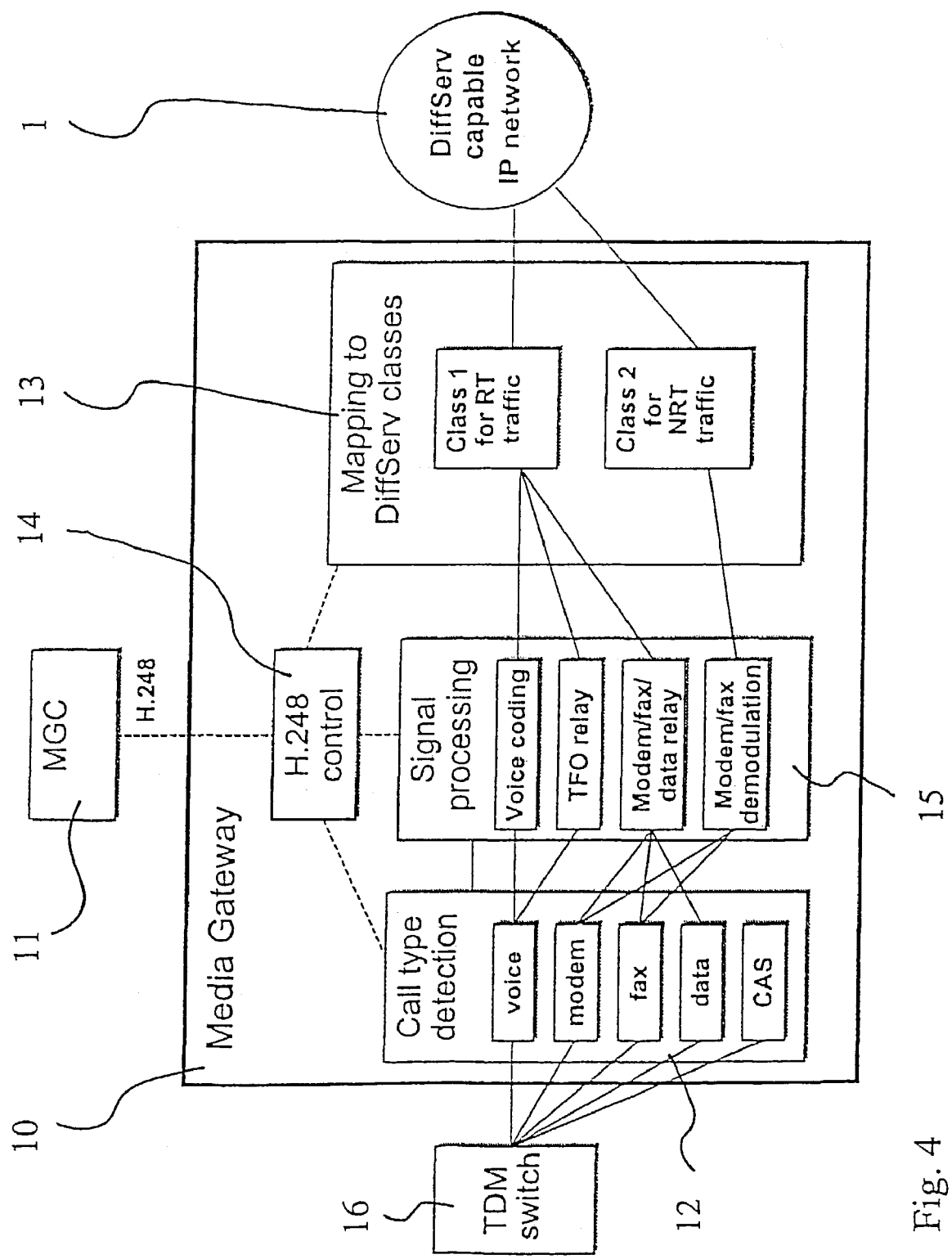

Referring now also to FIG. 2, an example of a general QoS framework for the media gateway 10 will be described. The described general framework may be applied for e.g. the DiffServ and the MPLS schemes. FIGS. 3 and 4 relate to more detailed arrangements employing the FIG. 2 arrangement for the DiffServ and MPLS schemes, respectively.

FIG. 2 is a schematic presentation of the general principle for a media gateway 10 in accordance with an embodiment. The gateway is located between a time division multiplexing (TDM) switch 16 of a telephone network and a data network 1. The data network 1 is shown to consist of an IP protocol based packet switched network. The TDM switch 16 is arranged to switch time slots i.e. calls. The TDM switch may be implemented e.g. in the PSTN network 2 of FIG. 1. The gateway 10 is operated under control by the media gateway controller 11.

The gateway 10 is shown to include three elements for the handling of the quality of service (QoS) function. From the three functional elements the H.248 control 14 is employed in the control of the gateway 10. More particularly, the media gateway 10 is controlled via an extended H.248 protocol by the controller 11. The extended H.248 protocol may be used to control the QoS class selection on a single channel basis. The control is preferably dynamic. The H.248 protocol is extended by means of an appropriate data structures for enabling the communication for the QoS purposes. For example, the H.248 protocol may be extended to define a data packet that associates with predefined QoS information. Examples of the QoS information and possible data packets will be given below.

The following is an example of an extended MEGACO protocol message that can be used for the transportation of the service class information between the controller 11 and the gateway 10.

```
MEGACO/1 [123.123.123.4] :55555
    Transaction = 10003 {
    Context = $ {
    Add = A4444, Add. = $ {
    Media {
    Stream = 1 {
    LocalControl { Mode = ReceiveOnly, nt/jit=40,
    QoS/ToS=3 },
    Local { v=0 c=IN IP4 $ m=audio $ RTP/AVP 4
    a=ptime:30 }
    } } } } }
```

The gateway 10 may acknowledge the message by:

```
MEGACO/1 [124.124.124.222] :55555
    Reply = 10003 {
        Context = 2000 {
        Add = A4444, Add = A4445 {
        Media {
        Stream = 1 {
```

-continued

```
Local { v=0 c=IN IP4 124.124.124.222 m=audio 2222
RTP/AVP 4 a=ptime:30 }
} } } } } }
```

In the above message the controller 11 connects an existing termination A4444 and the IP termination $ to context $. '$' means that the gateway 10 is allowed to give appropriate identities for these two elements. The acknowledgement by the gateway can be combined with the original message by means of the transaction identity ('10003' in the above example). The gateway reports also the IP address and RTP port that were allocated for the call by the gateway. The controller request the gateway also to generate a 'ReceiveOnly' termination with 40 ms buffering.

The information regarding the service class may be added in the 'LocalControl' element of the message. In the above example this parameter is 'QoS/ToS=3'. The QoS indicates the name of the added H.248 package for QoS functionality and the ToS indicates the name of the parameter. '3' is the value of the ToS parameter.

If the gateway cannot provide the class, it may return a separate error message or an indication of this (an error value) in the acknowledgement message.

The structure of the QoS packet that contains the added H.248 package for the QoS functionality may, for example, contain the following elements:

```
QoS Package
    PackageID: qos (0x0050)
    Version: 1
    Extends (Optional): None
Properties
ExecuteToS
    PropertyID: tos (0x0001)
    Type: Double: 8 byte signed integer
    Possible Values: any integer
    Defined in: LocalControl
Events
Cause
    EventID:Cause (0x0001)
    ObservedEventsDescriptor Parameters:
        Completion Code
            ParameterID: cc (0x0001)
            Type:enumeration
            Possible values:
                "SU" (0x0001) Completion
                succesfull
                "ME" (0x0002) Mapping of
                ToS bit unsuccesful
Signals
    None
Statistic
    None
Procedures
```

In the above the QoS package defines a mechanism to transfer Quality of Service class between the MG and MGC. If the class cannot be provided, the MG can return error value. The value of the 'PropertyID' integer represents the class of the 'Type of Service'. These properties allow the MG to return an error cause if, for example, the mapping of the service class was not successful. The above message may be used so that the MGC informs the MG to set a certain class of service to certain IP-packets. In a preferred embodiment the MG is expected to inform whether it can do so or not.

The type of the communication i.e. the call type may be, for example, a voice call, a modem call, a fax call, a data call or a call used for channel associated signalling (CAS) or any other call type that may be used by the communication system to differentiate different kinds of connections from each other. The channel associated signalling may be used for signalling between two or several exchanges in the communication system, i.e. refers to a call that does not necessarily involve any user terminals.

Information of the call type may be obtained from the detection block or element 12 of the gateway 10. The detection element 12 may be arranged to monitor all calls that are routed through the gateway from a network to another network. A possible decision procedure of the call type detection element 12 is shown in more detail in the flowchart of FIG. 5. As illustrated, the detection element 12 may detect a modem or fax call based on a predefined tone, such as a 2100 Hz tone that is typically used for indicating a modem or fax call. The detection element 12 may also be adapted to detect a data call framing based on a predefined bit pattern in the incoming data flow. If the detection element 12 does not detect any of the above predefined events, it can be assumed that the call is a voice call. It should be appreciated that the above is only an example of a possible detection process. The order of the detection steps and/or rules for the detection may vary between different applications.

According to an alternative for the detection element 12 that is implemented in the gateway 10, the call type information may also be determined by the media gateway controller (MGC) 11 based on information that it is available for the controller. This approach may be preferred if the call type is known beforehand and/or stored in the media gateway controller 11. The controller 11 may also determine the call type based on information that associates with the call, e.g. base on information of the B-number (the called party) or the A-number (calling party).

The QoS classifier element 13 is employed to map the call to different quality of service (QoS) classes in accordance with the instructions from the MGC 11. The elements in the call path will then proceed the call in accordance with the assigned service class. Although the following two examples show only two classes, the calls may be classified into a number of classes that may be selected based on the application.

In a possible classification scheme the IP packets are marked with an appropriate class identifier. For example, an IP header codepoint may be used when the DiffServ scheme is employed. The routers and other elements in the packet switched communication path will then treat the packet in accordance with the class information in the header. The router may, for example, assign the packets in different queues and/or forward the data packets based on the service class information.

Multi-Protocol Label Switching (MPLS) scheme may also be employed in the future media gateway arrangements. The basic concept of the MPLS scheme is to add a local label in front of an IP packet, said local label acting as an end-to-end routing index in the intermediate routers. The QoS differentiation may thus be based on mapping of the MPLS tunnels to ATM (Asynchronous Transfer Mode) channels. The ATM channels may be assigned to different service classes and adaptation layers. The ATM service classes include classes such as CBR (Constant Bit Rate), VBR (Variable Bit Rate) and ABR (Available Bit Rate). Possible ATM adaptation layers are such as AAL0, AAL2, or AAL5. Separate IP/ATM channels may be used for different QoS classes in the MPLS scheme as the MPLS tunnels may have different ATM parameters. Thus the QoS differentiation may be based on said different ATM parameters. For example, the controller 11 may decide what ATM traffic class is to be used for the call and add this information into the protocol message so as to control the operation of the gateway 10.

The demodulated modem and fax streams may be classified to belong in a non-real time (NRT) class, as the gateway acts as an access server when demodulating modems. Possible signalling can be classified to the NRT QoS class. The voice and relayed modem/fax/data calls should be in a normal case classified to a real time (RT) QoS class. However, the classification of the call types may depend of the application.

FIG. 2 show also a signal processing functionality 15. The skilled person is aware of the signal processing required by a gateway function, and therefore this function will not be explained in more detail. It is sufficient to note that signal processing typically includes operations such as voice coding, modem and/or fax demodulation, various relay operations and so on. As shown by the lines between various elements of blocks 12 and 15 of FIGS. 3 and 4, the required signal processing operations for a call depends on the call type.

The arrangement is such that the media gateway controller 11 is adapted to make the decisions with regard to the QoS classification. The controller is provided with necessary data processor facility to accomplish the decision routine. The gateway is adapted to operate in accordance with the instructions from the media gateway controller 11. The instructions are contained in the extended protocol message.

FIG. 3 shows a more detailed example employing the MPLS model already discussed above. The calls may be classified to two QoS classes: a real time (RT) traffic class and a non-real time (NRT) traffic class. The RT class uses ATM CBR (constant bit rate) service class and the NRT class ATM VBR (variable bit rate) service class.

FIG. 4 shows an example of the use of the DiffServ model. Again, only two QoS classes are shown to be used: one for the RT traffic and the other for the NRT traffic.

It is also possible to use a combination of the FIGS. 3 and 4 embodiments. In such implementations the IP packets can be assigned to the appropriate DiffServ classes while they may also be transferred via MPLS tunnels.

Figure 5:
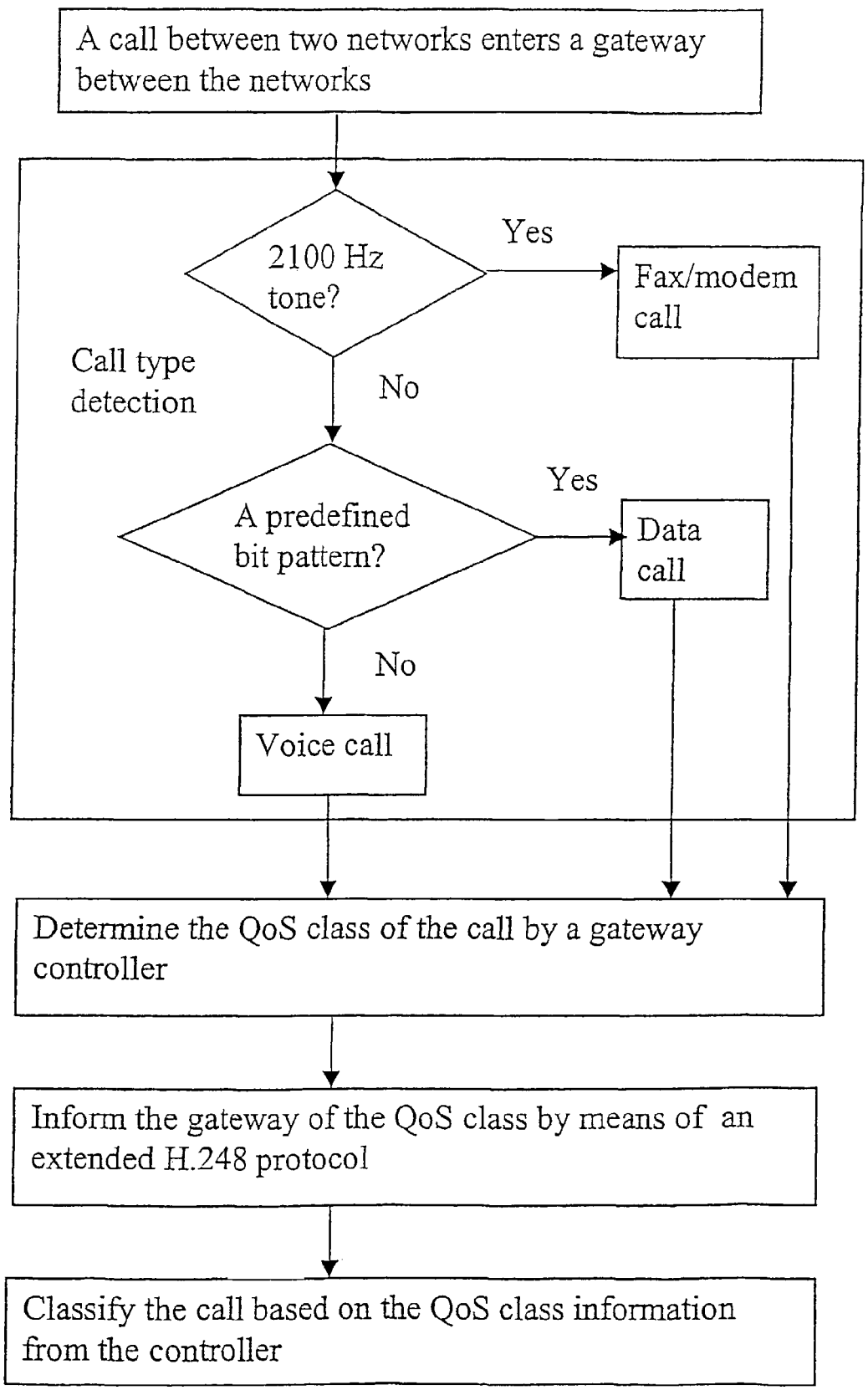
FIG. 5 is a flowchart illustrating the operation of one embodiment of the present invention.

The flowchart of FIG. 5 illustrates the operation in accordance with an embodiment of the present invention. The operation will be described in the following with reference to FIGS. 1 and 6. A communication connection is initiated by a PSTN network terminal 5' and enters through the PSTN network 2 the media gateway 10. At the same time call signalling may enter the media gateway controller 11 via the signalling interface between the PSTN 2 and the controller 11. The signalling may be based e.g. on a signalling system 7 (SS7) signalling protocol. The call signalling between the controller entity 11 and the data network 1 may be based on any appropriate protocol, such as H.323 or Session Initiation Protocol (SIP).

The call type may be defined by means of a detection element of the gateway 10, for example based on the decision algorithm shown by FIG. 5. The call type information may also be determined by the controller 11, e.g. based on data that associates with the call.

After the call type determination the controller 11 proceeds to make a decision regarding the QoS class. The controller 11 may determine the class information based on information that associates with the call. The necessary information may be included in and obtained from a B-number (the called party) or alias analysis. This may be used, for example, when the B-number is an emergency number or a predefined number in the IP network. The class information may also be attached to the A-number (calling party) analysis data, for example when the call originates from the data network 1 (i.e. the A-number is connect to the data network). The media gateway controller 11 may be adapted to check for each call the A-number, B-number or alias data to find out whether a QoS class has been set for the call or not.

After the service class has been decided, the controller 11 generates a H.248 message containing an indication of the decided service class to the gateway 10. The gateway may then classify and proceed the call in accordance with the priority class decided by the controller 11. For example, the classifier 13 may attach the priority class information to the data packets to be transported further to the IP network 1. The classifier 13 may alternatively select an appropriate ATM channel for the transportation of the data or use some other appropriate process for the service differentiation.

The call originating from the PSTN 2 may terminate in another terminal or network element 5" connected to the IP network 1. The classification scheme may also be applied for calls that originate from the data network side.

The embodiments may provide advantages e.g. in that emergency calls can be assigned with a higher QoS class (priority) than the "normal" calls. The MGC 11 may make decision in this regard and inform the gateway 10 of the QoS class that is to be used for the call in the IP packets. Other basis for the decision of the appropriate QoS classes (priorities) may be used, for example a subscriber may have paid more money to receive a better voice quality. Policy beyond the decision regarding the proper QoS class is up to implementation and operator's needs.

The data is described as being in packet form. In alternative embodiments of the invention the data may be sent in any suitable format.

The embodiment of the invention has discussed a gateway function between two networks. Embodiments of the present invention can be applicable to gateway arrangements between more than two networks, e.g. for conference calls wherein at least three terminals in three different networks participate.

It is also noted herein that while the above describes exemplifying embodiments of the invention, there are several variations and modifications which may be made to the disclosed solution without departing from the scope of the present invention as defined in the appended claims.

The invention claimed is:

1. A method in a communication system, comprising:
   receiving a call to be routed from a first network to a second network at a gateway;
   determining the type of the call, wherein the type of the call is selected from the group consisting of a voice call, a modem call, a fax call, a data call, and a call for channel associated signaling, and further wherein the type of the call is determined to be a voice call if neither a predefined tone nor a predefined bit pattern is detected;
   determining in a gateway controller a communication service class that is to be used for the call;
   communicating information that is associated with the determined communication service class from the gateway controller to the gateway using a communication protocol message configured to transport said information from the gateway controller to the gateway, wherein the communication protocol message is based on a modified version of ITU-T recommendation No. H.248, the modified version including an element that is configured to communicate information regarding the determined service class; and
   processing the call based on said information received at the gateway.

2. A method as claimed in claim 1, wherein the communication service classes comprise at least two quality of service classes.

3. A method as claimed in claim 1, wherein the communication protocol message is based on a gateway control protocol.

4. A method as claimed in claim 1, wherein the type of the call is determined based on information from a call type detection function provided in the gateway.

5. A method as claimed in claim 1, wherein the determining of the type of the call comprises monitoring for the predefined tone in a call signaling.

6. A method as claimed in claim 1, wherein the determining of the type of the call comprises monitoring for the predefined bit pattern.

7. A method as claimed in claim 1, wherein the determining of the type of the call is based on information that associates with the call and that is available to the gateway controller.

8. A method as claimed in claim 1, wherein the service class information is contained in a data element included in the protocol message.

9. A method as claimed in claim 1, wherein at least one of the networks is a packet switched data network.

10. A method as claimed in claim 9, wherein said at least one network is an Internet protocol data network.

11. A method as claimed in claim 1, wherein the call comprises a voice call between two terminals, the first terminal being connected to the first network and the second terminal being connected to the second network.

12. A method as claimed in claim 1, wherein the call is classified by a classifier function of the gateway based on the class information received from a gateway controller function.

13. A method as claimed in claim 1, wherein the protocol message is configured to transport information that associates with the type of service field of the call.

14. A method as claimed in claim 1, wherein the protocol message is configured to transport information that associates with differentiated services codepoint.

15. A method as claimed in claim 1, wherein the protocol message is configured to transport information that associates with multi-protocol label switched/asynchronous transfer mode parameter.

16. A method as claimed in claim 1, wherein a service differentiation is based on mapping between multi-protocol label switched tunnels and asynchronous transfer mode channels.

17. A method as claimed in claim 1, wherein the gateway assigns data packets that associate the call with a class identifier based on said information of the determined communication service class.

18. A method as claimed in claim 1, wherein the gateway controller determines the service class based on at least one of the following information: origin of the call; destination of the call; alias of the call.

19. A method as claimed in claim 18, wherein the gateway controller monitors for each call whether or not origin of the call and/or destination of the call and/or alias of the call information fields include an indication of the service class.

20. A method as claimed in claim 1, wherein the gateway controller provides dynamic control of the classification function of the gateway.

21. A gateway arrangement for a communication system, comprising:
a gateway;
a gateway controller configured to control the gateway and configured to determine the communication service class of a call routed through a gateway function;
a processor configured to determine a type of the call routed through the gateway, wherein the type of the call is selected from the group consisting of a voice call, a modem call, a fax call, a data call, and a call for channel associated signaling, and further wherein the type of the call is determined to be a voice call if neither a predefined tone nor a predefined bit pattern is detected;
an interface between the gateway controller and the gateway configured to communicate information that is associated with the determined service class using a communication protocol message configured to transport said information, wherein the communication protocol message is based on a modified version of ITU-T recommendation No. H.248, the modified version including an element that is configured to communicate information regarding the determined service class; and
a call processor configured to process the call in the gateway in accordance with the information received at the gateway.

22. A gateway arrangement as claimed in claim 21, wherein the communication protocol message is based on a gateway control protocol.

23. A gateway arrangement as claimed in claim 21, wherein the call is classified by a classifier function of the gateway based on the communicated information received from the gateway controller.

24. A gateway arrangement as claimed in claim 21, wherein the communication protocol message is configured to communicate information that associates with the type of service field of the call.

25. A gateway arrangement as claimed in claim 21, wherein the communication protocol message is configured to communicate information that associates with differentiated services codepoint.

26. A gateway arrangement as claimed in claim 21, wherein the communication protocol message is configured to communicate information that associates with multi-protocol label switched/asynchronous transfer mode parameter.

27. A gateway arrangement as claimed in claim 21, wherein a service differentiation is based on mapping between multi-protocol label switched tunnels and asynchronous transfer mode channels.

28. A gateway arrangement as claimed in claim 21, wherein the gateway is configured to assign data packets that associate the call with a class identifier based on the communicated determined service class.

29. A gateway arrangement as claimed in claim 21, wherein the gateway controller is configured to determine the service class based on at least one of the following information: origin of the call; destination of the call; alias of the call.

30. A gateway arrangement for a communication system, comprising:
a gateway;
gateway controller means to control the gateway and for determining the communication service class of a call routed through the gateway;
interface means for connecting the gateway controller means and the gateway and configured to communicate information that is associated with the determined communication service class by a communication protocol message configured to transport said information, wherein the communication protocol message is based on a modified version of ITU-T recommendation No. H.248, the modified version including an element that is configured to communicate information regarding the determined service class; and processor means configured to determine a type of the call routed through the gateway, wherein the type of the call is selected from the group consisting of a voice call, a modem call, a fax call, a data call, and a call for channel associated signaling, and further wherein the type of the call is determined to be a voice call if neither a predefined tone nor a predefined bit pattern is detected, the processor means further configured to process the call in the gateway in accordance with the information received at the gateway.

31. A gateway arrangement as claimed in claim 30, wherein the gateway controller means is configured to monitor for each call whether or not origin of the call and/or destination of the call and/or alias of the call information fields include an indication of the service class.

32. A gateway arrangement as claimed in claim 30, wherein the communication protocol message is configured to communicate information that associates with the type of service field of the call.

33. A gateway arrangement as claimed in claim 30, wherein the communication protocol message is configured to communicate information that associates with differentiated services codepoint.

34. A gateway arrangement as claimed in claim 30, wherein the communication protocol message is configured to communicate information that associates with multi-protocol label switched/asynchronous transfer mode parameter.

35. A gateway arrangement as claimed in claim 30, wherein a service differentiation is based on mapping between multi-protocol label switched tunnels and asynchronous transfer mode channels.

* * * * *